United States Patent
Annoura (10) Patent No.: US 8,566,004 B2
(45) Date of Patent: Oct. 22, 2013

(54) FUEL INJECTION CONTROL APPARATUS FOR INTERNAL COMBUSTION ENGINE

(75) Inventor: Toshiki Annoura, Nagoya (JP)

(73) Assignee: Denso Corporation, Kariya (JP)

( * ) Notice: Subject to any disclaimer, the term of this patent is extended or adjusted under 35 U.S.C. 154(b) by 1080 days.

(21) Appl. No.: 12/535,959

(22) Filed: Aug. 5, 2009

(65) Prior Publication Data

US 2010/0036593 A1 Feb. 11, 2010

(30) Foreign Application Priority Data

Aug. 8, 2008 (JP) ................................. 2008-205948

(51) Int. Cl.
| | | |
|---|---|---|
| B60T 7/12 | (2006.01) | |
| G05D 1/00 | (2006.01) | |
| G06F 7/00 | (2006.01) | |
| G06F 17/00 | (2006.01) | |
| F02M 51/00 | (2006.01) | |
| F01P 7/16 | (2006.01) | |
| F02D 41/00 | (2006.01) | |

(52) U.S. Cl.
USPC ............ 701/103; 123/486; 123/578; 123/689

(58) Field of Classification Search
USPC ................. 123/1 A, 299, 300, 304, 486, 494, 123/575–578, 689; 701/103
See application file for complete search history.

(56) References Cited

U.S. PATENT DOCUMENTS

| | | | | | |
|---|---|---|---|---|---|
| 4,404,944 A | * | 9/1983 | Yamazaki et al. | ............ | 123/458 |
| 5,038,730 A | * | 8/1991 | Kashima | .................. | 123/179.21 |
| 5,179,925 A | * | 1/1993 | Orminski | ...................... | 123/491 |
| 5,179,926 A | * | 1/1993 | Ament | .......................... | 123/494 |
| 5,220,895 A | * | 6/1993 | Curran et al. | .................. | 123/491 |
| 5,255,656 A | * | 10/1993 | Rader et al. | .................... | 123/494 |
| 5,325,836 A | | 7/1994 | Orzel et al. | | |
| 5,367,264 A | | 11/1994 | Brabetz | | |
| 5,414,367 A | * | 5/1995 | Ogawa | .......................... | 324/663 |
| 8,113,186 B2 | * | 2/2012 | Tsunooka et al. | ............ | 123/698 |
| 2005/0126551 A1 | * | 6/2005 | Mello et al. | .................... | 123/549 |
| 2009/0210135 A1 | * | 8/2009 | Miyata et al. | ................. | 701/103 |
| 2010/0241362 A1 | * | 9/2010 | Yoshikawa et al. | ............. | 702/24 |

FOREIGN PATENT DOCUMENTS

| | | |
|---|---|---|
| JP | 3-85347 | 4/1991 |
| JP | 5-223733 | 8/1993 |
| JP | 5-288707 | 11/1993 |
| JP | 6-213855 | 8/1994 |
| JP | 2006-322401 | 11/2006 |

* cited by examiner

*Primary Examiner* — Stephen K Cronin
*Assistant Examiner* — Sherman Manley
(74) *Attorney, Agent, or Firm* — Nixon & Vanderhye PC (57) ABSTRACT

An alcohol concentration sensor detects an alcohol concentration in fuel that is supplied to an internal combustion engine. A fuel injection quantity is controlled in accordance with a detection value of the alcohol concentration that is detected by the alcohol concentration sensor. When a temperature of the fuel, which is detected by a fuel temperature sensor or estimated from intake air temperature etc., is equal to or lower than a predetermined limit temperature, the detection value of the alcohol concentration, which is detected by the alcohol concentration sensor, is memorized as a memorized value of the alcohol concentration. When the temperature of the fuel is higher than the predetermined limit temperature, the fuel injection quantity is controlled by using the memorized value of the alcohol concentration instead of using the detection value, which is currently detected by the alcohol concentration sensor.

8 Claims, 5 Drawing Sheets

| | | MEMORIZED VALUE OF ALCOHOL CONCENTRATION | | |
|---|---|---|---|---|
| | | 0% | 50% | 100% |
| FUEL PRESSURE | 100kPa | 130°C | ... | 78°C |
| | 300kPa | ... | ... | ... |
| | 500kPa | 150°C | ... | 120°C |

|  | | MEMORIZED VALUE OF ALCOHOL CONCENTRATION | | |
|---|---|---|---|---|
|  | | 0% | 50% | 100% |
| RUNNING TIME OF FUEL PUMP | <2sec | 80°C | ... | 50°C |
| | ≥2sec | 100°C | ... | 70°C |

FUEL INJECTION CONTROL APPARATUS FOR INTERNAL COMBUSTION ENGINE

CROSS REFERENCE TO RELATED APPLICATION

This application is based on and incorporates herein by reference Japanese Patent Application No. 2008-205948 filed on Aug. 8, 2008.

BACKGROUND OF THE INVENTION

1. Field of the Invention

The present invention relates to a fuel injection control apparatus for an internal combustion engine, which performs a fuel injection control by using an alcohol concentration in the fuel detected by an alcohol concentration detector.

2. Description of Related Art

Recently, social needs for $CO_2$ emission reduction and use of alternative fuels are increasing. Accordingly, a demand for a vehicle having an internal combustion engine, for which any one of gasoline, alcohol (ethanol, methanol, etc.) and alcohol blended fuel can be used, is increasing. In such a vehicle, if an alcohol concentration of fuel that is currently refueled to a fuel tank is different from an alcohol concentration of fuel that is refueled to the fuel tank last time, the alcohol concentration of fuel in the fuel tank changes. A stoichiometric air-fuel ratio of gasoline is different from that of alcohol. Therefore, when the alcohol concentration of fuel changes, the stoichiometric air-fuel ratio of the fuel changes. Accordingly, it is necessary to change fuel injection quantity (actual air-fuel ratio) in accordance with the alcohol concentration of the fuel.

In this regard, JP3-085347A describes a fuel supply control apparatus that detects an alcohol concentration of fuel supplied to an internal combustion engine with an alcohol concentration sensor, and corrects fuel injection quantity in accordance with a detection value of the alcohol concentration.

With regard to the alcohol concentration sensor, JP5-507561T describes a capacitive alcohol concentration sensor that measures a capacitance of fuel in order to detect an alcohol concentration of the fuel. JP5-223733A describes an optical alcohol concentration sensor that measures a transmitted light that has transmitted through fuel in order to detect an alcohol concentration of the fuel.

The boiling point of alcohol is lower than the boiling point of gasoline. Therefore, when alcohol fuel (pure alcohol fuel or blended fuel that contains alcohol) is used, vapor (bubbles) can be generated in the fuel more easily. In the above-mentioned capacitive alcohol concentration sensor and optical alcohol concentration sensor, an accuracy of measurement of the capacitance of fuel or the transmitted light that has transmitted through fuel is lowered when vapor is generated in the fuel. Accordingly, the detection accuracy of the alcohol concentration is lowered.

In the fuel supply control apparatus described in JP3-085347A, the fuel injection quantity is corrected in accordance with the detection value of the alcohol concentration in the fuel, which is detected by the alcohol concentration sensor. Therefore, if vapor is generated in the fuel to lower the detection accuracy of the alcohol concentration sensor, the fuel injection quantity is corrected with the detection value of the alcohol concentration, which contains a large detection error. Accordingly, an accuracy of the fuel injection control is lowered, and a deviation of the fuel injection quantity (deviation of the air-fuel ratio) is increased. As a result, a rotational speed of the internal combustion engine can be unstable, and emission can become worse.

SUMMARY OF THE INVENTION

The present invention is made in view of the above-mentioned problem. Thus, it is an objective of the present invention to provide a fuel injection control apparatus for an internal combustion engine, which can secure an accuracy of a fuel injection control that reflects an alcohol concentration in fuel even when vapor is generated in the fuel and a detection accuracy of an alcohol concentration detector is lowered.

To achieve the objective of the present invention, there is provided a fuel injection control apparatus for an internal combustion engine. The fuel injection control apparatus has an alcohol concentration detector, a fuel injection controller, a fuel temperature determining means and a memory device. The alcohol concentration detector detects an alcohol concentration in fuel supplied to the internal combustion engine. The fuel injection controller performs a fuel injection control of the internal combustion engine by using a detection value of the alcohol concentration, which is detected by the alcohol concentration detector. The fuel temperature determining means detects or estimates a temperature of the fuel. The memory device memorizes the detection value of the alcohol concentration, which is detected by the alcohol concentration detector, as a memorized value of the alcohol concentration when the temperature of the fuel is equal to or lower than a predetermined limit temperature. The fuel injection controller performs the fuel injection control by using the memorized value of the alcohol concentration, which has been memorized by the memory device, instead of using the detection value of the alcohol concentration, which is currently detected by the alcohol concentration detector, when the temperature of the fuel is higher than the predetermined limit temperature.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF EXEMPLARY EMBODIMENTS

Several embodiments for carrying out the present invention will be described hereafter.

(First Embodiment)

A first embodiment of the present invention will be described hereafter referring to FIGS. 1-4.

Figure 1:
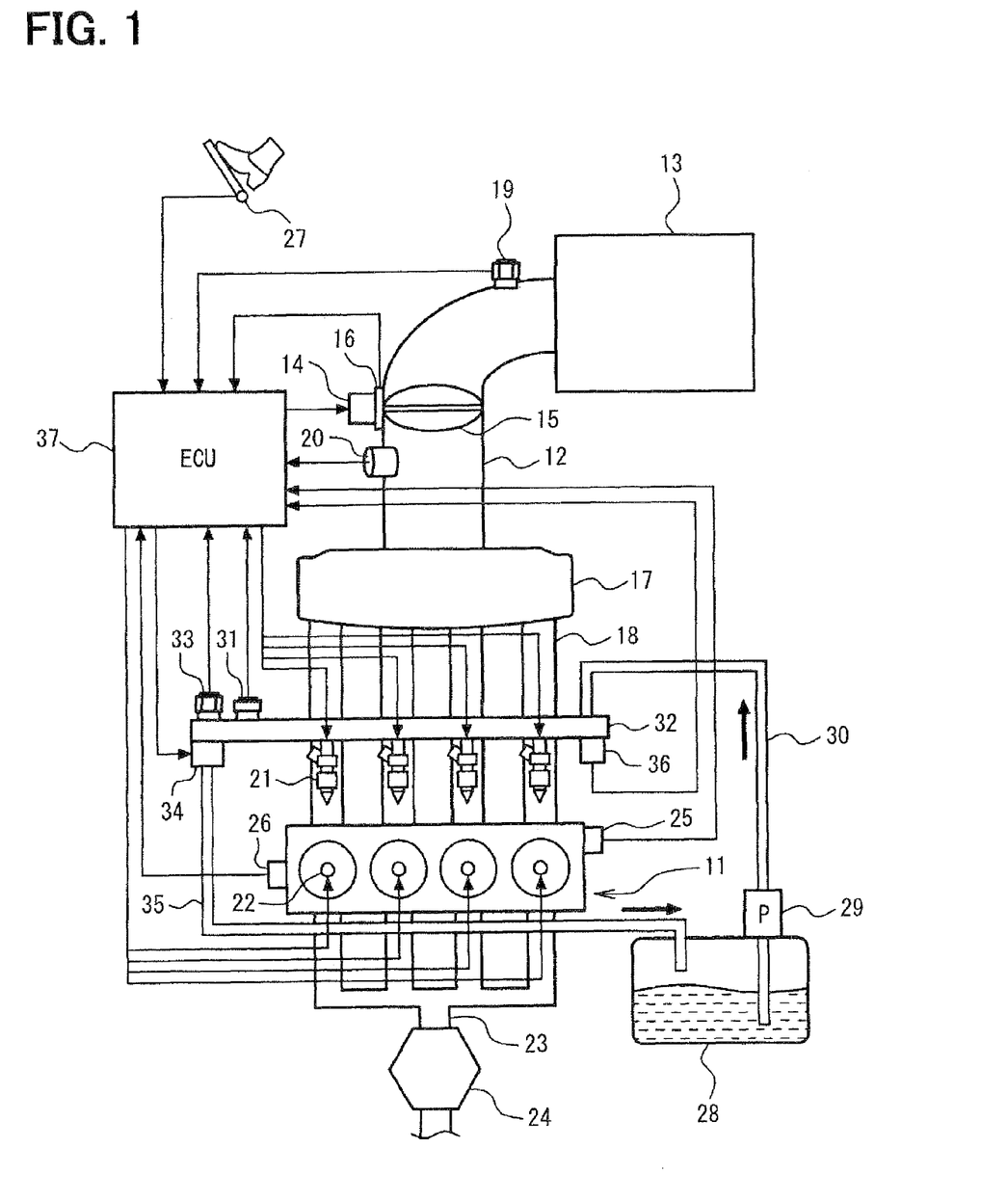
FIG. 1 is a schematic diagram showing a configuration of an engine control system having a fuel injection control apparatus according to a first embodiment of the present invention.

Firstly, an entire configuration of an engine control system will be schematically described referring to FIG. 1.

An air cleaner 13 is installed at a most upstream part of an intake pipe 12 of an engine (internal combustion engine) 11. A throttle valve 15 and a throttle position sensor 16 are installed on a downstream side of the air cleaner 13. A motor 14 adjusts an opening degree of the throttle valve 15. The throttle position sensor 16 detects the opening degree of the throttle valve 15.

A surge tank 17 is installed on a downstream side of the throttle valve 15. An intake manifold 18 for introducing air into cylinders of the engine 11 is connected with the surge tank 17. An intake air temperature sensor 19 for detecting temperature of intake air is installed on an upstream side of the throttle valve 15. An intake pipe pressure sensor 20 for detecting intake pipe pressure is installed on the downstream side of the throttle valve 15.

A fuel injection valve 21 for injecting fuel is installed in the intake manifold 18 in proximity to an intake port of each cylinder of the engine 11. A spark plug 22 is installed on a cylinder head of the engine 11 for each cylinder. A spark discharge of the spark plug 22 ignites air-fuel mixture in the cylinder. A catalytic converter 24 such as a three-way catalytic converter for clarifying exhaust gas is installed on an exhaust pipe 23 of the engine 11.

Moreover, a coolant temperature sensor 25 and a crank angle sensor 26 are installed on the cylinder block of the engine 11. The coolant temperature sensor 25 detects coolant temperature. The crank angle sensor 26 outputs a pulse signal every time a crankshaft rotates by a predetermined crank angle. A crank angle A and a rotational speed of the engine 11 are detected based on the output signal of the crank angle sensor 26. Furthermore, an accelerator sensor 27 detects an operation amount of an accelerator (pedaling amount of an accelerator pedal).

Any one of gasoline, alcohol (ethanol, methanol, etc.) and alcohol blended fuel can be used as fuel of the engine 11. A fuel tank 28 is refueled with gasoline, alcohol (ethanol, methanol, etc.) or alcohol blended fuel, and the fuel is supplied to the engine 11. A fuel pump 29 for drawing up the fuel is installed in the fuel tank 28 in which the fuel is reserved. The fuel pump 29 is driven by an electric motor (not shown) of which an electric power source is a battery (not shown). The fuel discharged from the fuel pump 29 is supplied to a delivery pipe 32 through a fuel pipe 30. Then, the fuel is distributed from the delivery pipe 32 to the fuel injection valves 21 for respective cylinders. A fuel temperature sensor (fuel temperature determining means) 31 and a fuel pressure sensor (fuel pressure detector) 33 are installed in the delivery pipe 32. The fuel temperature sensor 31 detects fuel temperature in the delivery pipe 32. The fuel pressure sensor 33 detects fuel pressure in the delivery pipe 32.

A relief valve 34 is installed on the delivery pipe 32. A discharge port of the relief valve 34 is connected to the fuel tank 28 through a return pipe 35. The relief valve 34 is an electromagnetically driven valve of which an opening/closing state can be controlled. When the relief valve 34 is closed, the fuel pressure in the delivery pipe 32 is maintained. When the relief valve 34 is opened, a part of the fuel in the delivery pipe 32 is returned to the fuel tank 28 through the return pipe 35, and the fuel pressure in the delivery pipe 32 is lowered.

An alcohol concentration sensor (alcohol concentration detector) 36 for detecting an alcohol concentration in the fuel is installed at a proper position on a fuel supply path from the fuel tank 28 to the fuel injection valves 21. In the first embodiment, the alcohol concentration sensor 36 is installed in the delivery pipe 32 that is located in the proximity of the fuel injection valves 21. The alcohol concentration sensor 36 may be any kind of an alcohol concentration sensor. For example, the alcohol concentration sensor 36 may be a capacitive alcohol concentration sensor that measures a capacitance of fuel, which changes in accordance with a dielectric constant of the fuel, to detect the alcohol concentration of the fuel. Alternatively, the alcohol concentration sensor 36 may be an optical alcohol concentration sensor that measures an amount of transmitted light that has transmitted through the fuel (transmittance of the light) to detect the alcohol concentration of the fuel.

Outputs of these sensors are inputted into an engine control circuit (hereafter referred to as ECU) 37. The ECU 37 is configured to incorporate a microcomputer as a main component. The ECU 37 performs various engine control programs memorized in ROMs (memory medium) incorporated in the ECU 37. Therefore, the ECU 37 can control fuel injection quantities of the fuel injection valves 21 and ignition timings of the spark plugs 22 in accordance with running state of the engine 11.

The boiling point of alcohol is lower than the boiling point of gasoline. Therefore, when alcohol fuel (pure alcohol fuel or blended fuel that contains alcohol) is used, vapor (bubbles) can be generated in the fuel more easily. In the capacitive alcohol concentration sensor and optical alcohol concentration sensor, an accuracy of measurement of the capacitance of the fuel or the transmitted light that has transmitted through the fuel is lowered when vapor is generated in the fuel. Accordingly, the detection accuracy of the alcohol concentration is lowered.

Figure 2:
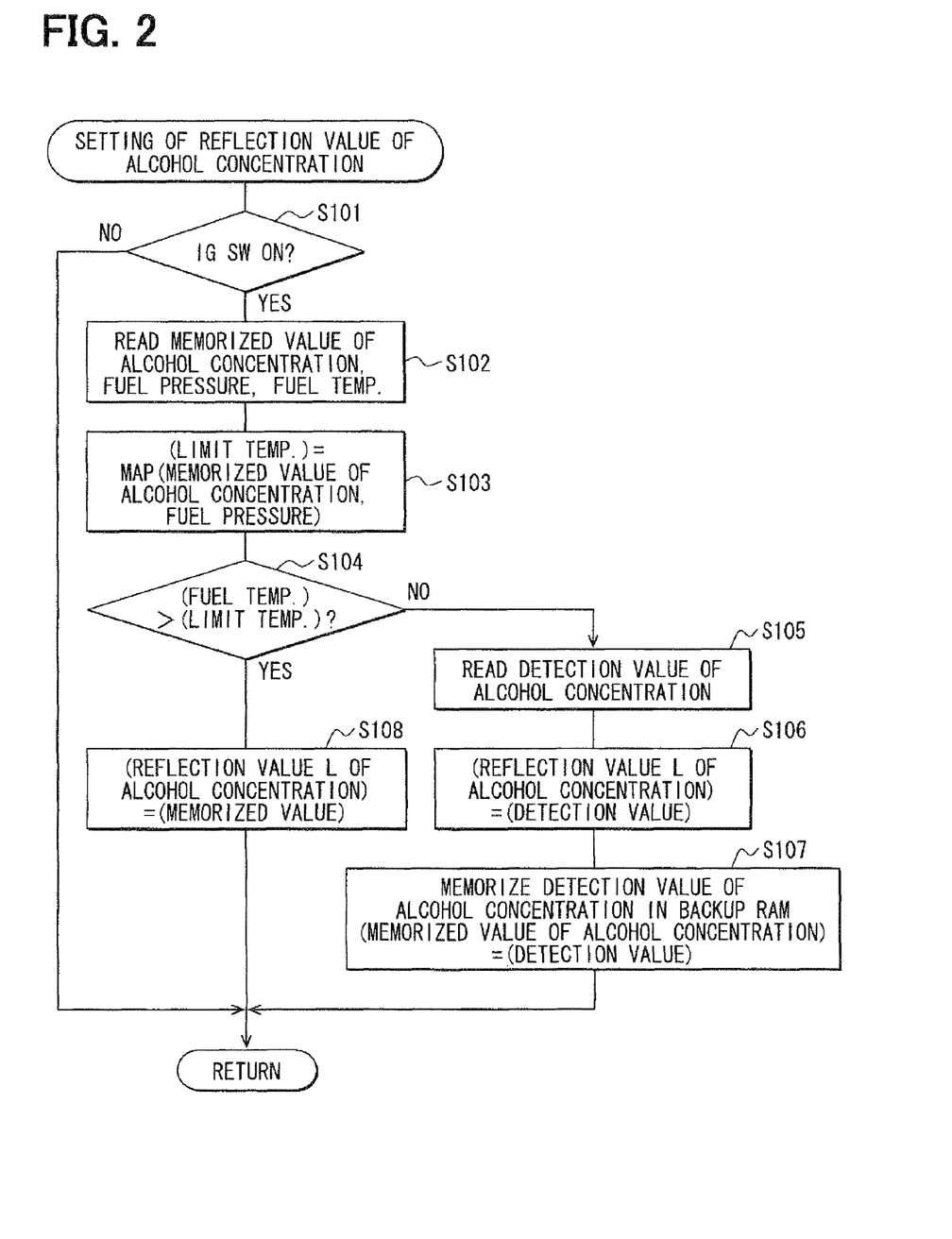
FIG. 2 is a flowchart showing an alcohol concentration reflection value setting routine executed by the fuel injection control apparatus according to the first embodiment.
Figure 3:
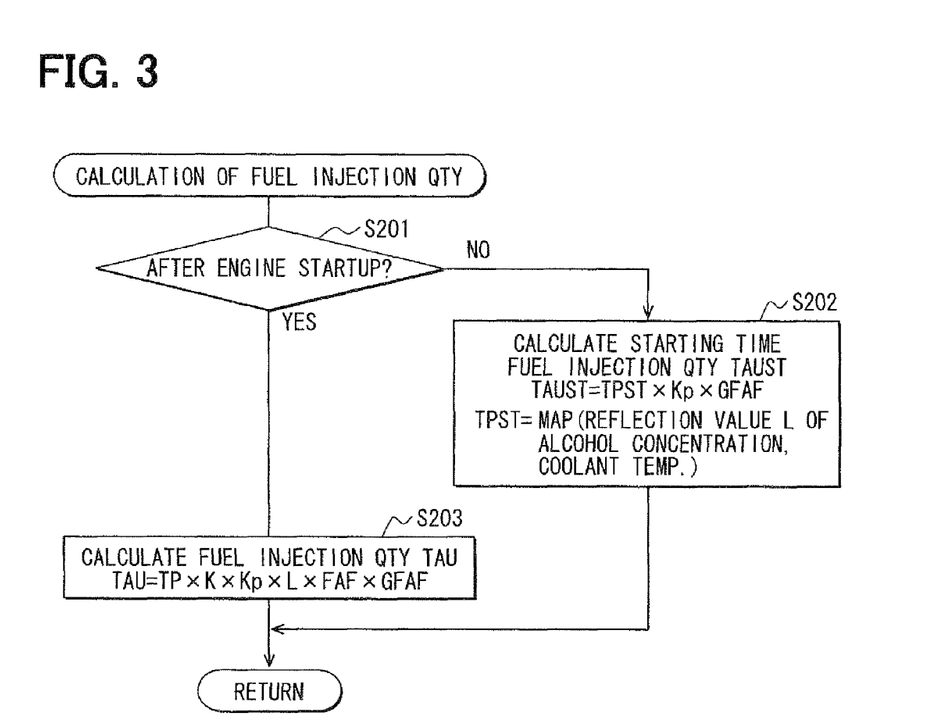
FIG. 3 is a flowchart showing a fuel injection quantity calculating routine executed by the fuel injection control apparatus according to the first embodiment.

In this regard, the ECU 37 performs a fuel injection control as follows with the alcohol concentration in the fuel, by executing respective routines for the fuel injection control, which are shown in FIGS. 2, 3 and are described later.

The ECU 37 determines whether the fuel temperature detected by the fuel temperature sensor 31 is higher than a predetermined limit temperature (for example, an upper limit of the fuel temperature for preventing generation of vapor). If it is determined that the fuel temperature is equal to or lower than the limit temperature, vapor is not generated in the fuel. Therefore, it is determined that the detection accuracy of the alcohol concentration sensor 36 is high. Accordingly, the ECU 37 performs the fuel injection control by calculating the fuel injection quantity with a current detection value of the alcohol concentration in the fuel, which is detected by the alcohol concentration sensor 36 with high accuracy. Then, the current detection value of the alcohol concentration in the fuel, which is detected by the alcohol concentration sensor 36 with high accuracy, is memorized in a rewritable non-volatile memory (a rewritable memory that maintains stored data even when electric power of the ECU 37 is switched off) such as a backup RAM of the ECU 37.

If it is determined that the fuel temperature is higher than the limit temperature, vapor may be generated in the fuel. Therefore, it is determined that the detection accuracy of the alcohol concentration sensor 36 may be lowered. Accordingly, the ECU 37 does not use the current detection value of the alcohol concentration in the fuel, which is detected by the alcohol concentration sensor 36, for the fuel injection control. The ECU 37 performs the fuel injection control by calculating the fuel injection quantity with a memorized value of the alcohol concentration in the fuel, which is memorized in the rewritable non-volatile memory (memory device) such as the backup RAM of the ECU 37. In this manner, when the fuel temperature is equal to or lower than the limit temperature (when the detection accuracy of the alcohol concentration sensor 36 is high), the memorized value of the alcohol concentration in the fuel is detected with high accuracy. Then, the memorized value of the alcohol concentration in the fuel is memorized in the rewritable non-volatile memory such as the backup RAM. The ECU 37 performs the fuel injection control with the memorized value of the alcohol concentration in the fuel, which is memorized in the rewritable non-volatile memory.

If the fuel temperature at a starting of the engine 11 is higher than the limit temperature, the ECU 37 performs the fuel injection control with the memorized value of the alcohol concentration in the fuel, which is memorized in the rewritable non-volatile memory such as the backup RAM of the ECU 37. Accordingly, the ECU 37 performs the fuel injection control with the memorized value of the alcohol concentration in the fuel, which has been detected with high accuracy when the fuel temperature was lower than the limit temperature before the engine 11 was stopped last time, and has been memorized. Processes in routines for the fuel injection control, which are shown in FIGS. 2, 3 and are performed by the ECU 37, will be described hereafter.

A routine for setting a reflection value of the alcohol concentration, which is shown in FIG. 2, is repeated at predetermined intervals while the electric power of the ECU 37 is switched on. When this routine is started, firstly at step S101, it is determined whether an IG switch (ignition switch) (not shown) is switched on or not. If it is determined that the IG switch is switched on, the process proceeds to step S102. At step S102, the memorized value of the alcohol concentration in the fuel, which is memorized in the rewritable non-volatile memory such as the backup RAM of the ECU 37, is read out. The fuel pressure detected by the fuel pressure sensor 33 and the fuel temperature detected by the fuel temperature sensor 31 are also read out.

Figure 4:
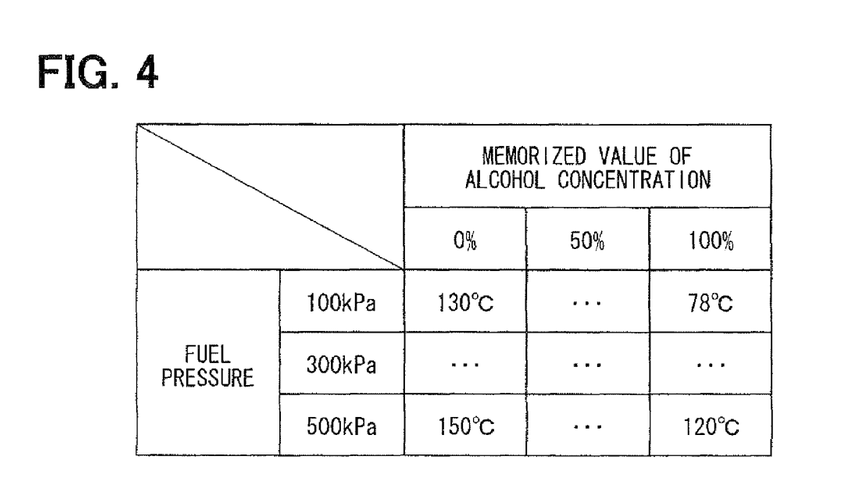
FIG. 4 is a diagram schematically showing an example of a map of a limit temperature used by the fuel injection control apparatus according to the first embodiment.

Then, the process proceeds to step S103. At step S103, the ECU 37 calculates the limit temperature in accordance with the fuel temperature and the memorized value of the alcohol concentration in the fuel, referring to a map of the limit temperature shown in FIG. 4. There are a characteristic that the boiling point (a fuel temperature at which vapor is generated) of the fuel becomes higher as the fuel pressure becomes higher, and a characteristic that the boiling point of the fuel becomes lower as the alcohol concentration in the fuel becomes higher. In this regard, the map shown in FIG. 4 is configured so that the limit temperature would be a temperature that is a little lower than the boiling point of the fuel (that is, the upper limit of the fuel temperature for preventing generation of vapor). Therefore, in the map, the limit temperature becomes higher as the fuel pressure becomes higher, and the limit temperature becomes lower as the alcohol concentration in the fuel becomes higher.

Then, the process proceeds to step S104. At step S104, it is determined whether the fuel temperature is higher than the limit temperature or not. If it is determined that the fuel temperature is equal to or lower than the limit temperature, vapor is not generated in the fuel. Therefore, it is determined that the detection accuracy of the alcohol concentration sensor 36 is high, and the process proceeds to step S105. At step S105, the ECU 37 reads out the current detection value of the alcohol concentration in the fuel, which is detected by the alcohol concentration sensor 36 with high accuracy. Next, at step S106, the ECU 37 sets the current detection value of the alcohol concentration in the fuel, which is detected by the alcohol concentration sensor 36 with high accuracy, as the reflection value L of the alcohol concentration (Reflection value L of alcohol concentration)=(Detection Value of Alcohol Concentration)

Then, the process proceeds to step S107. At step S107, the current detection value of the alcohol concentration in the fuel, which is detected by the alcohol concentration sensor 36 with high accuracy, is memorized in the rewritable non-volatile memory such as the backup RAM of the ECU 37 so as to update the memorized value of the alcohol concentration.

(Memorized Value of Alcohol Concentration)=(Detection Value of Alcohol Concentration)

If it is determined at step S104 that the fuel temperature is higher than the limit temperature, vapor may be generated in the fuel. Therefore, it is determined that the detection accuracy of the alcohol concentration sensor 36 may be lowered, and the process proceeds to step S108. At step S108, the memorized value of the alcohol concentration, which has been memorized in the rewritable non-volatile memory such as the backup RAM of the ECU 37, is set as the reflection value L of the alcohol concentration. That is, the memorized value of the alcohol concentration in the fuel, which has been detected when the fuel temperature was equal to or lower than the limit temperature (when the detection accuracy of the alcohol concentration sensor 36 was high) and has been memorized, is set as the reflection value L of the alcohol concentration.

(Reflection value L of alcohol concentration)=(Memorized Value of Alcohol Concentration)

If the fuel temperature at a starting of the engine 11 is higher than the limit temperature, the ECU 37 sets the memorized value of the alcohol concentration in the fuel, which is memorized in the rewritable non-volatile memory such as the backup RAM of the ECU 37, as the reflection value L of the alcohol concentration. Accordingly, the ECU 37 sets the memorized value of the alcohol concentration in the fuel, which has been detected with high accuracy when the fuel temperature was lower than the limit temperature before the engine 11 was stopped last time, as the reflection value L of the alcohol concentration.

A routine for calculating the fuel injection quantity, which is shown in FIG. 3, is repeated at predetermined intervals while the electric power of the ECU 37 is switched on, and serves as a fuel injection controller in the claims. When this routine is started, firstly at step S201, it is determined whether an engine startup is finished or not.

If it is determined at step S201 that the engine startup is not finished yet (that is, the engine 11 is being started up), the process proceeds to step S202. At step S202, in accordance with the following equation, a starting time fuel injection quantity TAUST is calculated from a starting time basic injection quantity TPST, a fuel pressure correction coefficient $K_p$, an air-fuel ratio learned value GFAF, etch $$TAUST = TPST \times K_p \times GFAF$$

Here, the basic injection quantity TPST is calculated with reference to a map etc. from the reflection value L of the alcohol concentration and the coolant temperature.

If it is determined at step S201 that the engine startup is finished (that is, the engine 11 is running), the process proceeds to step S203. At step S203, in accordance with the following equation, a fuel injection quantity TAU is calculated from a basic injection quantity TP, a boosting coefficient K, the fuel pressure correction coefficient $K_p$, the reflection value L of the alcohol concentration, an air-fuel ratio feedback correction coefficient FAF, the air-fuel ratio learned value GEAF, etc.

$$TAU = TP \times K \times K_p \times L \times FAF \times GFAF$$

In the above-described first embodiment, if it is determined that the fuel temperature is equal to or lower than the limit temperature, vapor is not generated in the fuel. Therefore, it is determined that the detection accuracy of the alcohol concentration sensor 36 is high. Accordingly, the ECU 37 performs the fuel injection control with the current detection value of the alcohol concentration in the fuel, which is detected by the alcohol concentration sensor 36 with high accuracy. Then, the current detection value of the alcohol concentration in the fuel, which is detected by the alcohol concentration sensor 36 with high accuracy, is memorized in the rewritable non-volatile memory such as the backup RAM of the ECU 37. If it is determined that the fuel temperature is higher than the limit temperature, vapor may be generated in the fuel. Therefore, it is determined that the detection accuracy of the alcohol concentration sensor 36 may be lowered. Then, the ECU 37 does not use the current detection value of the alcohol concentration in the fuel, which is detected by the alcohol concentration sensor 36, for the fuel injection control. The ECU 37 performs the fuel injection control with the memorized value of the alcohol concentration in the fuel, which has been detected when the fuel temperature was equal to or lower than the limit temperature (when the detection accuracy of the alcohol concentration sensor 36 was high) and has been memorized. Accordingly, even when vapor is generated in the fuel and the detection accuracy of the alcohol concentration sensor 36 is lowered, it is possible to secure the accuracy of the fuel injection control with the alcohol concentration in the fuel. Therefore, it is possible to inhibit a deviation of the fuel injection quantity (deviation of the air-fuel ratio) and to stabilize the rotational speed of the engine 11.

Moreover, if the fuel temperature at the starting of the engine 11 is higher than the limit temperature, the ECU 37 performs the fuel injection control with the memorized value of the alcohol concentration in the fuel, which has been detected with high accuracy when the fuel temperature was lower than the limit temperature before the engine 11 was stopped last time and has been memorized. Accordingly, even when vapor is generated in the fuel in a hot restart of the engine 11 and the detection accuracy of the alcohol concentration sensor 36 is lowered, it is possible to secure the accuracy of the fuel injection control with the alcohol concentration in the fuel and to improve startability.

Furthermore, in the first embodiment, the limit temperature is set in accordance with the fuel pressure and the memorized value of the alcohol concentration in the fuel. Therefore, the limit temperature is changed correspondingly with a change of the boiling point of the fuel (a fuel temperature at which vapor is generated), which changes in accordance with the fuel pressure and the alcohol concentration in the fuel. Accordingly, it is possible to set the limit temperature at a proper value corresponding to the fuel pressure and the alcohol concentration in the fuel (for example, at the upper limit of the fuel temperature for preventing generation of vapor).

At a position close to the injection valves 21 in the fuel supply path from the fuel tank 28 to the fuel injection valves 21, the fuel temperature is easily heated by the heat of the engine 11, and vapor is easily generated in the fuel. Therefore, if the alcohol concentration sensor 36 is installed at the position close to the fuel injection valves 21 in the fuel supply path, the detection accuracy of the alcohol concentration sensor 36 is easily lowered by the effect of vapor. In this regard, in the first embodiment, it is possible to secure the accuracy of the fuel injection control with the alcohol concentration in the fuel even when vapor is generated in the fuel and the detection accuracy of the alcohol concentration sensor 36 is lowered. Therefore, it is possible to secure the accuracy of the fuel injection control in the configuration in which the alcohol concentration sensor 36 is installed in the delivery pipe 32 in the fuel supply path, which is located in the proximity of the fuel injection valves 21. In this configuration, even when the alcohol concentration in the fuel is changed by refueling, a quantity of the fuel before the refueling, which has been remaining in the fuel supply path between the alcohol concentration sensor 36 and the fuel injection valves 21 (that is, a quantity of residual fuel of which the alcohol concentration cannot be detected by the alcohol concentration sensor 36), is relatively small. Accordingly, it is possible to lessen the influence of the refueling that changes the alcohol concentration.

However, the alcohol concentration sensor 36 may be installed in the fuel tank 28. Even in this case, it is possible to attain the intended purpose of the present invention.

(Second Embodiment)

Next, a second embodiment of the present invention will be described referring to FIGS. 5, 6. In the second embodiment, parts that are substantially the same as those in the first embodiment will not be described or will be briefly described, and parts that are different from the first embodiment will be mainly described.

Figure 5:
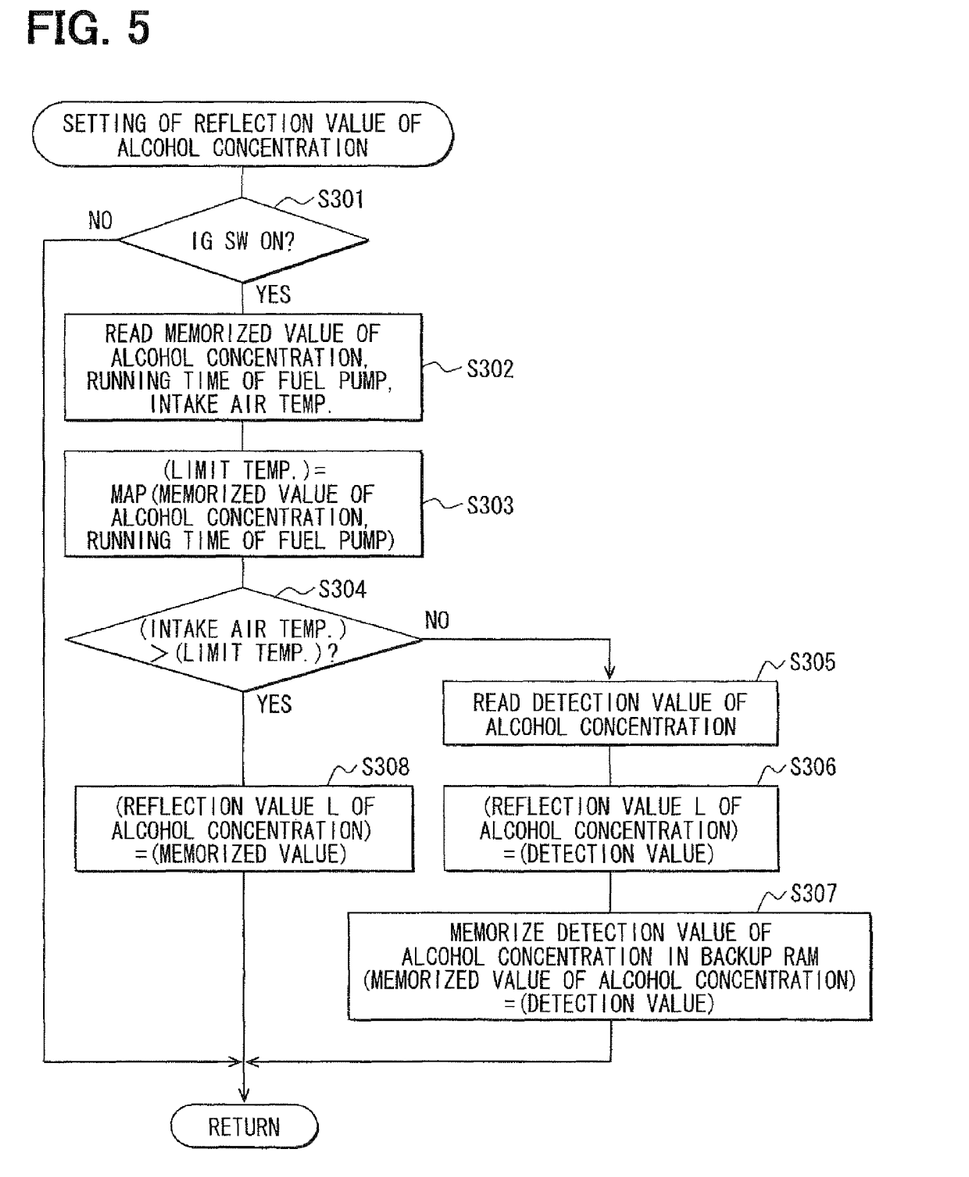
FIG. 5 is a flowchart showing an alcohol concentration reflection value setting routine executed by a fuel injection control apparatus according to a second embodiment of the present invention.
Figure 6:
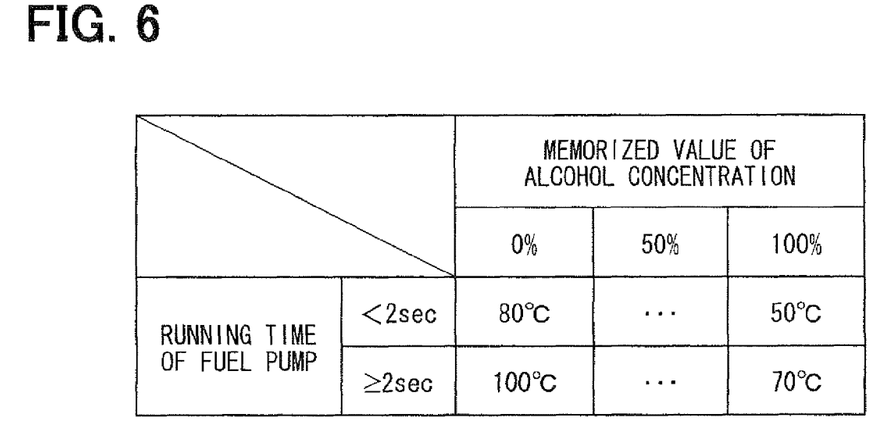
FIG. 6 is a diagram schematically showing an example of a map of a limit temperature used by the fuel injection control apparatus according to the second embodiment.

In the second embodiment, the ECU 37 performs a routine for setting a reflection value of the alcohol concentration, which is shown in FIG. 5 and will be described later. In the routine, a running time of the fuel pump 29 (elapsed time since the operation of the fuel pump 29 is started) is used as an information of the fuel pressure, and intake air temperature is used as an information of the fuel temperature. The limit temperature is set in accordance with the running time of the fuel pump 29 (the information of the fuel pressure) and the memorized value of the alcohol concentration in the fuel. Then, it is determined whether the intake air temperature (the information of the fuel temperature) is higher than the limit temperature or not in order to determine whether vapor is generated in the fuel or not.

Processes in the routine for setting the reflection value of the alcohol concentration, which is shown in FIG. 5 and is performed by the ECU 37, will be described hereafter. In this routine, if it is determined at step S301 that the IG switch is switched on, the process proceeds to step S302. At step S302, the ECU 37 reads out the memorized value of the alcohol concentration in the fuel, which is memorized in the rewritable non-volatile memory such as the backup RAM of the ECU 37, the running time of the fuel pump 29 (elapsed time since the fuel pump 29 is started), the intake air temperature, which is detected by an intake air temperature sensor 19, etc.

Then, the process proceeds to step S303. At step S303, the ECU 37 calculates the limit temperature in accordance with the running time of the fuel pump 29 and the memorized value of the alcohol concentration in the fuel, referring to a map of the limit temperature shown in FIG. 6. The fuel pressure rises as time elapses after the operation of the fuel pump 29 is started. Then, the fuel pressure is generally maintained at a predetermined pressure (for example, at a set pressure of the pressure regulator, etc.). In this regard, the map shown in FIG. 6 is configured so that the limit temperature would become higher as the fuel pressure becomes higher when the running time of the fuel pump 29 is equal to or longer than a predetermined time (for example, 2 seconds), and the limit temperature would become lower as the alcohol concentration in the fuel becomes higher.

Then, the process proceeds to step S304. At step S304, it is determined whether the intake air temperature is higher than the limit temperature or not. If it is determined that the intake air temperature is equal to or lower than the limit temperature, the fuel temperature is relatively low, and vapor is not generated in the fuel. Accordingly, it is determined that the detection accuracy of the alcohol concentration sensor 36 is high. Therefore, the ECU 37 sets the current detection value of the alcohol concentration in the fuel, which is detected by the alcohol concentration sensor 36 with high accuracy, as the reflection value L of the alcohol concentration. Then, the current detection value of the alcohol concentration in the fuel is memorized in the rewritable non-volatile memory such as the backup RAM of the ECU 37 so as to update the memorized value of the alcohol concentration (steps S305-S307).

If it is determined at step S304 that the intake air temperature is higher than the limit temperature, the fuel temperature is relatively high, and vapor may be generated in the fuel. Therefore, it is determined that the detection accuracy of the alcohol concentration sensor 36 may be lowered. Accordingly, the memorized value of the alcohol concentration, which has been memorized in the rewritable non-volatile memory such as the backup RAM of the ECU 37, is set as the reflection value L of the alcohol concentration. That is, the memorized value of the alcohol concentration in the fuel, which has been detected when the intake air temperature was equal to or lower than the limit temperature (when the detection accuracy of the alcohol concentration sensor 36 was high) and has been memorized, is set as the reflection value L of the alcohol concentration (step S308).

In the above-described second embodiment, focusing attention on that the running time of the fuel pump 29 can be the information for estimating the fuel pressure, the limit temperature is set in accordance with the running time of the fuel pump 29 and the memorized value of the alcohol concentration in the fuel. Therefore, the limit temperature is changed correspondingly with a change of the boiling point of the fuel (a fuel temperature at which vapor is generated), which changes in accordance with the fuel pressure and the alcohol concentration in the fuel. Accordingly, it is possible to set the limit temperature at a proper value in accordance with the fuel pressure and the alcohol concentration in the fuel.

Moreover, in the second embodiment, the running time of the fuel pump 29 is used s the information of the fuel pressure, and the intake air temperature is used as the information of the fuel temperature. Therefore, the fuel pressure sensor 33 and the fuel temperature sensor 31 can be eliminated from the configuration of the fuel injection control apparatus, so as to realize a reduction of manufacturing cost, which is an important technological goal.

In the above-described second embodiment, the intake air temperature is used as the information of the fuel temperature. However, the coolant temperature, engine oil temperature, engine temperature, etc. can also be used as the information of the fuel temperature. It is also possible to estimate the fuel temperature based on one or some of the intake air temperature, the coolant temperature, the engine oil temperature, the engine temperature, etc.

In addition, an application of the present invention is not limited to the intake port injection engine as shown in FIG. 1. For example, the present invention may be applied also to an in-cylinder injection engine, a dual injection engine that is provided with both of fuel injection valves for intake port injection and fuel injection valves for in-cylinder injection, etc.

Additional advantages and modifications will readily occur to those skilled in the art. The invention in its broader terms is therefore not limited to the specific details, representative apparatus, and illustrative examples shown and described.

What is claimed is:

1. A fuel injection control apparatus for an internal combustion engine, comprising:
   an alcohol concentration detector configured to detect an alcohol concentration in fuel supplied to the internal combustion engine;
   a fuel pressure detector configured to detect a pressure of the fuel; and
   a processing system, comprising a computer processor, configured to:
      perform a fuel injection control of the internal combustion engine by using a detection value of the alcohol concentration, which is detected by the alcohol concentration detector;
      determine a temperature of the fuel;
      memorize, in a memory device, the detection value of alcohol concentration, which is detected by the alcohol concentration detector, as a memorized value of the alcohol concentration when the temperature of the fuel is equal to or lower than a predetermined limit temperature;
      switch a control value from the detection value of the alcohol concentration, which is currently detected by the alcohol concentration detector, to the memorized value of the alcohol concentration, which has been memorized by the memory device, when the temperature of the fuel is higher than the predetermined limit temperature;
      perform the fuel injection control by using the control value; and
      adjust the predetermined limit temperature in accordance with the pressure of the fuel, which is detected by the fuel pressure detector, and the memorized value of the alcohol concentration, which is memorized by the memory device.

2. A fuel injection control apparatus for an internal combustion engine, comprising:
   an alcohol concentration detector configured to detect an alcohol concentration in fuel supplied to the internal combustion engine;
   a fuel pump for supplying the fuel from a fuel tank to a fuel injection valve of the internal combustion engine; and
   a processing system, comprising a computer processor, configured to:
      perform a fuel injection control of the internal combustion engine by using a dectecion value of the alcohol concentration, which is dectected by the alcohol concentration dectector;
      determine a temperature of the fuel;
      memorize, in a memory device, the detection value of the alcohol concentration, which is detected by the alcohol concentration detector, as a memorized value of the alcohol concentration when the temperature of the fuel is equal to or lower than a predetermined limit temperature;
      switch a control value from the detection value of the alcohol concentration, which is currently detected by the alcohol concentration detector, to the memorized value of the alcohol concentration, which has been memorized by the memory device, when the temperature of the fuel is higher than the predetermined limit temperature;
      perform the fuel injection control by using the control value; and
      adjust the predetermined limit temperature in accordance with a running time of the fuel pump and the memorized value of the alcohol concentration, which is memorized by the memory device.

3. The fuel injection control apparatus according to claim 1, wherein the processing system is further configured to adjust the predetermined limit temperature to be higher as the pressure of the fuel becomes higher.

4. The fuel injection control apparatus according to claim 2, wherein the processing system is further configured to adjust the predetermined limit temperature to be higher as the running time of the fuel pump becomes longer.

5. A method of controlling fuel injection control apparatus for an internal combustion engine, the method comprising:
- detecting an alcohol concentration in fuel supplied to the internal combustion engine;
- performing, using a processing system comprising a computer processor, a fuel injection control of the internal combustion engine by using a detection value of the detected alcohol concentration;
- detecting or estimating a temperature of the fuel;
- storing, in a non-transitory computer readable medium, a value of the detected alcohol concentration, as a stored value of the alcohol concentration when the temperature of the fuel is equal to or lower than a predetermined limit temperature;
- switching a control value from the detection value of the alcohol concentration, which is currently detected, to the stored value of the alcohol concentration when the temperature of the fuel is higher than the predetermined limit temperature;
- performing fuel injection control by using control value;
- detecting a pressure of the fuel; and
- adjusting the predetermined limit temperature in accordance with the detected pressure of the fuel and the stored value of the alcohol concentration.

6. A method of controlling fuel injection control apparatus for an internal combustion engine, the method comprising:
- detecting an alcohol concentration in fuel supplied to the internal combustion engine;
- performing, using a processing system comprising a computer processor, a fuel injection control of the internal combustion engine by using a detection value of the detected alcohol concentration;
- detecting or estimating a temperature of the fuel;
- storing, in a non-transitory computer readable medium, a value of the detected alcohol concentration, as a stored value of the alcohol concentration when the temperature of the fuel is equal to or lower than a predetermined limit temperature;
- switching a control value from the the detection value of the alcohol concentration, which is currently detected, to the stored value of the alcohol concentration when the temperature of the fuel is higher than the predetermined limit temperature;
- performing fuel injection control by using control value;
- supplying, via a fuel pump, the fuel from a fuel tank to a fuel injection valve of the internal combustion engine; and
- adjusting the predetermined limit temperature in accordance with a running time of the fuel pump and the stored value of the alcohol concentration.

7. The method of claim 5, wherein the predetermined limit temperature is adjusted to be higher as the pressure of the fuel becomes higher.

8. The method of claim 6, wherein the predetermined limit temperature is adjusted to be higher as the running time of the fuel pump becomes longer.

* * * * *